US 9,652,949 B1

United States Patent
Cronin et al.

(10) Patent No.: US 9,652,949 B1
(45) Date of Patent: May 16, 2017

(54) SENSOR EXPERIENCE GARMENT

(71) Applicant: ProSports Technologies, LLC, Miami, FL (US)

(72) Inventors: John E. Cronin, Bonita Springs, FL (US); Nick Reasner, Chicago, IL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 15/091,139

(22) Filed: Apr. 5, 2016

Related U.S. Application Data (63) Continuation of application No. 14/798,270, filed on Jul. 13, 2015, now Pat. No. 9,305,441.

(60) Provisional application No. 62/023,606, filed on Jul. 11, 2014, provisional application No. 62/029,610, filed on Jul. 28, 2014.

(51) Int. Cl.
| | |
|---|---|
| G08B 21/00 | (2006.01) |
| G08B 6/00 | (2006.01) |
| A41B 1/08 | (2006.01) |
| A41D 1/00 | (2006.01) |
| G06Q 20/32 | (2012.01) |

(52) U.S. Cl.
CPC ............ *G08B 6/00* (2013.01); *A41B 1/08* (2013.01); *A41D 1/002* (2013.01); *G06Q 20/322* (2013.01)

(58) Field of Classification Search
CPC ............ G01L 5/0052; G08B 6/00; G08B 1/08
USPC ............................................. 340/665, 407.1
See application file for complete search history.

(56) References Cited

U.S. PATENT DOCUMENTS

| | | | |
|---|---|---|---|
| 4,763,284 | A | 8/1988 | Carlin |
| 4,771,394 | A | 9/1988 | Cavanagh |
| 5,293,354 | A | 3/1994 | Costabile |
| 5,462,275 | A | 10/1995 | Lowe et al. |
| 6,013,007 | A | 1/2000 | Root et al. |
| 6,181,236 | B1 | 1/2001 | Schneider |
| 6,389,368 | B1 | 5/2002 | Hampton |
| 6,603,711 | B2 | 8/2003 | Calace |
| 6,760,276 | B1 | 7/2004 | Karr |
| 6,836,744 | B1 | 12/2004 | Asphahani et al. |
| 7,020,336 | B2 | 3/2006 | Cohen-Solal et al. |
| 7,031,225 | B2 | 4/2006 | McDonald |
| 7,115,053 | B2 | 10/2006 | Meichner |
| 7,173,533 | B1 | 2/2007 | Beron et al. |

(Continued)

FOREIGN PATENT DOCUMENTS

| | | |
|---|---|---|
| AU | 2014100006 | 2/2014 |
| CN | 102527007 | 7/2012 |

(Continued)

OTHER PUBLICATIONS

U.S. Appl. No. 15/187,100, John E. Cronin, Smart Field Goal Detector, filed Jun. 20, 2016.

(Continued)

*Primary Examiner* — Tai T Nguyen
(74) *Attorney, Agent, or Firm* — Polsinelli LLP (57) ABSTRACT

The present invention includes systems and methods for enhancing audience sensory experience. Light-emitting diodes and vibrators may activate on an audience member shirt when an actor receives a hit while wearing a shirt having sensors. The audience member may choose to receive input from a particular actor's shirt. The audience member may also choose to view a replay of an event and activate the associated light-emitting diodes and vibrators.

18 Claims, 8 Drawing Sheets

(56) References Cited

U.S. PATENT DOCUMENTS

| | | | |
|---|---|---|---|
| 7,174,277 B2 | 2/2007 | Vock et al. |
| 7,561,494 B2 | 7/2009 | Stern |
| 7,561,723 B2 | 7/2009 | Goldberg et al. |
| 7,602,301 B1 | 10/2009 | Stirling et al. |
| 7,618,312 B1 | 11/2009 | Kasten |
| 7,634,662 B2 | 12/2009 | Monroe |
| 7,693,668 B2 | 4/2010 | Vock et al. |
| 7,715,723 B2 | 5/2010 | Kagawa et al. |
| 7,805,149 B2 | 9/2010 | Werner et al. |
| 7,920,052 B2 | 4/2011 | Costabile |
| 8,054,174 B1 | 11/2011 | Uehran |
| 8,098,881 B2 | 1/2012 | Camp et al. |
| 8,239,146 B2 | 8/2012 | Vock et al. |
| 8,253,586 B1 | 8/2012 | Matak |
| 8,257,084 B1 | 9/2012 | Kreiner et al. |
| 8,257,228 B2 | 9/2012 | Quatrochi et al. |
| 8,289,185 B2 | 10/2012 | Alonso |
| 8,326,136 B1 | 12/2012 | Clark |
| 8,396,687 B2 | 3/2013 | Vock et al. |
| 8,477,046 B2 | 7/2013 | Alonso |
| 8,485,879 B2 | 7/2013 | Lin et al. |
| 8,554,495 B2 | 10/2013 | Mack et al. |
| 8,554,509 B2 | 10/2013 | Crisco et al. |
| 8,579,632 B2 | 11/2013 | Crowley |
| 8,589,667 B2 | 11/2013 | Mujtaba et al. |
| 8,611,930 B2 | 12/2013 | Louboutin et al. |
| 8,620,344 B2 | 12/2013 | Huang et al. |
| 8,626,465 B2 | 1/2014 | Moore et al. |
| 8,630,216 B2 | 1/2014 | Deivasigamani et al. |
| 8,660,501 B2 | 2/2014 | Sanguinetti |
| 8,684,819 B2 | 4/2014 | Thomas et al. |
| 8,702,504 B1 | 4/2014 | Hughes et al. |
| 8,706,044 B2 | 4/2014 | Chang et al. |
| 8,724,723 B2 | 5/2014 | Panicker et al. |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor et al. |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 8,994,498 B2 | 3/2015 | Agrafioti et al. |
| 9,305,441 B1 | 4/2016 | Cronin |
| 9,398,213 B1 | 7/2016 | Cronin |
| 9,474,933 B1 | 10/2016 | Cronin |
| 9,502,018 B2 | 11/2016 | Iwaki |
| 9,610,491 | 4/2017 | Cronin |
| 2001/0003715 A1 | 6/2001 | Jutzi et al. |
| 2001/0048484 A1 | 12/2001 | Tamir et al. |
| 2003/0163287 A1 | 8/2003 | Vock et al. |
| 2003/0210612 A1 | 11/2003 | Stern |
| 2005/0046584 A1 | 3/2005 | Breed |
| 2005/0117022 A1 | 6/2005 | Marchant |
| 2005/0162257 A1 | 7/2005 | Gonzalez |
| 2005/0242508 A1 | 11/2005 | Meichner |
| 2005/0277466 A1 | 12/2005 | Lock |
| 2006/0052147 A1 | 3/2006 | Matthews |
| 2006/0074338 A1* | 4/2006 | Greenwald .......... A61B 5/0002 600/549 |
| 2006/0109089 A1 | 5/2006 | Boehm et al. |
| 2006/0180073 A1 | 8/2006 | Nakamoto |
| 2006/0208169 A1 | 9/2006 | Breed et al. |
| 2006/0281061 A1 | 12/2006 | Hightower et al. |
| 2007/0003113 A1 | 1/2007 | Goldberg |
| 2007/0135264 A1 | 6/2007 | Rosenberg |
| 2007/0269203 A1 | 11/2007 | Awazu |
| 2008/0082311 A1 | 4/2008 | Meijer et al. |
| 2008/0129825 A1 | 6/2008 | DeAngelis et al. |
| 2008/0146302 A1 | 6/2008 | Olsen et al. |
| 2009/0023122 A1 | 1/2009 | Lieberman et al. |
| 2009/0029754 A1 | 1/2009 | Slocum et al. |
| 2009/0111582 A1 | 4/2009 | Schuler et al. |
| 2009/0256912 A1 | 10/2009 | Rosenberg |
| 2010/0026809 A1 | 2/2010 | Curry |
| 2010/0030350 A1 | 2/2010 | House et al. |
| 2010/0102938 A1 | 4/2010 | Delia et al. |
| 2010/0105503 A1 | 4/2010 | Daisher et al. |
| 2010/0144414 A1 | 6/2010 | Edis et al. |
| 2010/0185398 A1 | 7/2010 | Berns et al. |
| 2010/0283630 A1 | 11/2010 | Alonso |
| 2011/0013087 A1 | 1/2011 | House et al. |
| 2011/0064281 A1 | 3/2011 | Chan |
| 2011/0169959 A1 | 7/2011 | DeAngelis et al. |
| 2011/0181418 A1 | 7/2011 | Mack et al. |
| 2011/0184320 A1 | 7/2011 | Shipps et al. |
| 2011/0251802 A1* | 10/2011 | Song ................ A63B 69/004 702/41 |
| 2012/0002509 A1 | 1/2012 | Saguin et al. |
| 2012/0029666 A1 | 2/2012 | Crowley et al. |
| 2012/0052947 A1 | 3/2012 | Yun |
| 2012/0063272 A1 | 3/2012 | Dorais et al. |
| 2012/0081531 A1 | 4/2012 | DeAngelis et al. |
| 2012/0099405 A1 | 4/2012 | Lidor et al. |
| 2012/0100911 A1 | 4/2012 | Rejen |
| 2012/0116259 A1 | 5/2012 | McConnell et al. |
| 2012/0116548 A1 | 5/2012 | Goree et al. |
| 2012/0120201 A1 | 5/2012 | Ward |
| 2012/0124720 A1 | 5/2012 | Evans et al. |
| 2012/0166449 A1 | 6/2012 | Pitaliya |
| 2012/0197998 A1 | 8/2012 | Kessel et al. |
| 2012/0202594 A1 | 8/2012 | Bistis et al. |
| 2012/0212505 A1 | 8/2012 | Burroughs et al. |
| 2012/0223833 A1 | 9/2012 | Thomas et al. |
| 2012/0324491 A1 | 12/2012 | Bathiche et al. |
| 2013/0018494 A1 | 1/2013 | Amini |
| 2013/0045806 A1 | 2/2013 | Bloodworth |
| 2013/0060168 A1* | 3/2013 | Chu .................... A42B 3/046 600/595 |
| 2013/0066448 A1 | 3/2013 | Alonso |
| 2013/0080222 A1 | 3/2013 | Quinn |
| 2013/0091209 A1 | 4/2013 | Bennett et al. |
| 2013/0095924 A1 | 4/2013 | Geisner et al. |
| 2013/0126713 A1 | 5/2013 | Haas et al. |
| 2013/0138590 A1 | 5/2013 | Huke et al. |
| 2013/0139068 A1 | 5/2013 | Bowring |
| 2013/0141555 A1 | 6/2013 | Ganick et al. |
| 2013/0166048 A1 | 6/2013 | Werner et al. |
| 2013/0222133 A1 | 8/2013 | Schultz et al. |
| 2013/0235702 A1 | 9/2013 | Saguin et al. |
| 2013/0249708 A1 | 9/2013 | Moll-Carrillo et al. |
| 2013/0279917 A1 | 10/2013 | Son et al. |
| 2013/0303192 A1 | 11/2013 | Louboutin |
| 2013/0314407 A1 | 11/2013 | Meehan |
| 2013/0316837 A1 | 11/2013 | Coiner, Jr. |
| 2013/0317835 A1 | 11/2013 | Mathew |
| 2013/0322689 A1 | 12/2013 | Carmichael |
| 2013/0324239 A1 | 12/2013 | Ur et al. |
| 2013/0328917 A1 | 12/2013 | Zambetti |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0335635 A1 | 12/2013 | Ghanem et al. |
| 2013/0336662 A1 | 12/2013 | Murayama et al. |
| 2013/0343762 A1 | 12/2013 | Murayama et al. |
| 2014/0004939 A1 | 1/2014 | Kasten |
| 2014/0039354 A1 | 2/2014 | Greenwald et al. |
| 2014/0039355 A1 | 2/2014 | Crisco et al. |
| 2014/0039651 A1 | 2/2014 | Crowley |
| 2014/0062773 A1 | 3/2014 | MacGougan |
| 2014/0065962 A1 | 3/2014 | Le |
| 2014/0068847 A1 | 3/2014 | Kitowski |
| 2014/0071221 A1 | 3/2014 | Dave |
| 2014/0080638 A1 | 3/2014 | Feng et al. |
| 2014/0088454 A1 | 3/2014 | Mack |
| 2014/0105084 A1 | 4/2014 | Chhabra |
| 2014/0105466 A1 | 4/2014 | Botes et al. |

(56) References Cited

U.S. PATENT DOCUMENTS

| | | |
|---|---|---|
| 2014/0107817 A1 | 4/2014 | Ellis et al. |
| 2014/0111352 A1 | 4/2014 | Doherty |
| 2014/0125702 A1 | 5/2014 | Santillan et al. |
| 2014/0139380 A1 | 5/2014 | Ouyang |
| 2014/0141803 A1 | 5/2014 | Marti |
| 2014/0143940 A1 | 5/2014 | Luliano et al. |
| 2014/0155178 A1 | 6/2014 | Bloodworth |
| 2014/0162628 A1 | 6/2014 | Bevelacqua |
| 2014/0167794 A1 | 6/2014 | Nath |
| 2014/0168170 A1 | 6/2014 | Lazarescu |
| 2014/0168477 A1 | 6/2014 | David |
| 2014/0171114 A1 | 6/2014 | Marti |
| 2014/0180820 A1 | 6/2014 | Louboutin |
| 2014/0191979 A1 | 7/2014 | Tsudik |
| 2014/0200053 A1 | 7/2014 | Balasubramanian |
| 2014/0218184 A1 | 8/2014 | Grant et al. |
| 2014/0222335 A1 | 8/2014 | Piemonte |
| 2014/0232633 A1 | 8/2014 | Shultz |
| 2014/0232634 A1 | 8/2014 | Piemonte |
| 2014/0241730 A1 | 8/2014 | Jovicic et al. |
| 2014/0247279 A1 | 9/2014 | Nicholas |
| 2014/0247280 A1 | 9/2014 | Nicholas |
| 2014/0269562 A1 | 9/2014 | Burchill |
| 2014/0270375 A1 | 9/2014 | Canavan et al. |
| 2014/0274150 A1 | 9/2014 | Marti |
| 2014/0278218 A1 | 9/2014 | Chang |
| 2014/0283135 A1 | 9/2014 | Shepherd |
| 2014/0293959 A1 | 10/2014 | Singh |
| 2014/0361906 A1 | 12/2014 | Hughes et al. |
| 2014/0363168 A1 | 12/2014 | Walker |
| 2014/0364089 A1 | 12/2014 | Lienhart |
| 2014/0364148 A1 | 12/2014 | Block |
| 2014/0365120 A1 | 12/2014 | Vulcano |
| 2014/0365194 A1 | 12/2014 | O'Hagan et al. |
| 2014/0365640 A1 | 12/2014 | Wohl et al. |
| 2014/0371887 A1 | 12/2014 | Hoffman et al. |
| 2014/0375217 A1 | 12/2014 | Feri et al. |
| 2015/0011242 A1 | 1/2015 | Nagaraj |
| 2015/0026623 A1 | 1/2015 | Horne et al. |
| 2015/0033197 A1 | 1/2015 | Jouaux |
| 2015/0081713 A1 | 3/2015 | Alonso et al. |
| 2015/0131845 A1 | 5/2015 | Forouhar et al. |
| 2015/0187188 A1 | 7/2015 | Raskin |
| 2015/0296272 A1 | 10/2015 | Sonabend et al. |
| 2015/0306457 A1 | 10/2015 | Crankson et al. |
| 2016/0001159 A1 | 1/2016 | Riley et al. |
| 2016/0008693 A1 | 1/2016 | Cronin |
| 2016/0012810 A1 | 1/2016 | Cronin |
| 2016/0018278 A1* | 1/2016 | Jeter, II ................. A63B 24/00 340/665 |
| 2016/0073010 A1 | 3/2016 | Cronin |
| 2016/0096074 A1 | 4/2016 | Moll-Carrillo et al. |
| 2016/0107064 A1 | 4/2016 | Hoffman et al. |

FOREIGN PATENT DOCUMENTS

| | | |
|---|---|---|
| CN | 102843186 | 12/2012 |
| EP | 2 407 218 | 1/2012 |
| WO | WO 2008/030484 | 3/2008 |
| WO | WO 2009/104921 | 8/2009 |
| WO | WO 2011/004381 | 1/2011 |
| WO | WO 2012/100053 | 7/2012 |
| WO | WO 2013/011259 | 1/2013 |
| WO | WO 2013/166456 | 11/2013 |
| WO | WO 2014/008134 | 1/2014 |
| WO | WO 2014/052874 | 4/2014 |
| WO | WO 2014/100519 | 6/2014 |
| WO | WO 2016/007969 | 1/2016 |
| WO | WO 2016/007970 | 1/2016 |
| WO | WO 2016/039991 | 3/2016 |

OTHER PUBLICATIONS

U.S. Appl. No. 14/798,091 Office Action mailed Aug. 18, 2016.
U.S. Appl. No. 14/798,190 Final Office Action mailed Jul. 25, 2016.
U.S. Appl. No. 14/829,598 Final Office Action mailed Jul. 18, 2016.
U.S. Appl. No. 14/788,728 Office Action mailed Jul. 13, 2016.
U.S. Appl. No. 14/798,068 Office Action mailed Sep. 28, 2016.
U.S. Appl. No. 14/788,728 Final Office Action mailed Dec. 6, 2016.
U.S. Appl. No. 14/798,068 Final Office Action mailed May 5, 2016.
U.S. Appl. No. 14/798,131 Final Office Action mailed May 23, 2016.
U.S. Appl. No. 14/798,204 Final Office Action mailed May 11, 2016.
U.S. Appl. No. 14/788,742 Office Action mailed May 11, 2016.
U.S. Appl. No. 14/798,057, John E. Cronin, Professional Workout Simulator, filed Jul. 13, 2015.
U.S. Appl. No. 14/798,068, John E. Cronin, Player Hit System, filed Jul. 13, 2015.
U.S. Appl. No. 14/798,081, John E. Cronin, Smart Field Goal Detector, filed Jul. 13, 2015.
U.S. Appl. No. 14/798,091, John E. Cronin, Real-Time Data Collection and Selective Storage, filed Jul. 13, 2015.
U.S. Appl. No. 14/798,131, John E. Cronin, Real-Time Data Collection and Storage for Use in Fantasy Football, filed Jul. 13, 2015.
U.S. Appl. No. 14/798,204, John E. Cronin, Moving Monitoring Unit, filed Jul. 13, 2015.
U.S. Appl. No. 14/798,190, John E. Cronin, Player Movement Data Drives Video Game, filed Jul. 13, 2015.
U.S. Appl. No. 14/829,598, John E. Cronin, Facial Recognition for Event Venue Cameras, filed Aug. 18, 2015.
U.S. Appl. No. 14/788,728, John E. Cronin, Player Movement Data, filed Jun. 30, 2015.
U.S. Appl. No. 14/788,742, John E. Cronin, Event Video Capture, filed Jun. 30, 2015.
"About Head Case", Head Case Company, Sep. 24, 2013.
"adidas' miCoach SPEED_CELL and miCoach Football App Aim to Advance the Performance of Next-Generation Athletes Through New Technology", miCoach, Nov. 22, 2011.
"Advanced E-Team: Automatic Sports Time Stopping Whistle", Rose-Hulman Institute of Technology, 2002, NCIIA Funded Advanced E-Teams. Date of Download: Jun. 14, 2014. http://www.nciia.org/WebObjects/NciiaResources.woa/wa/View/GrantProfile?n=1000037.
"Affordable Concussion Management System for Young Athletes Offered by Head Case", Head Case Company, Sep. 24, 2013.
Ancona et al., N.; "Goal detection in football by using Support Vector Machines for classification" Neural Networks, vol. 1, pp. 611-616, 2001.
"AutoScout" ADSC Illinous at Singapore Pte Ltd. Sep. 21, 2015.
Belzer, Jason; "NFL Partners With Zebra Technologies to Provide Next Generation Player Tracking", Forbes/Sports Money, Jul. 31, 2014.
Brolinson et al., P. Gunner; "Analysis of Linear Head Accelerations from Collegiate Football Impacts", Current Sports Medicine Reports, 2006, vol. 5:23-28.
"Chapter 29. Outdoor Laser Operations", U.S. Department of Transportation, Feb. 9, 2012.
Cooley, Chris; "MMQB: Smart Football", The Official Blog of Chris Cooley, Jul. 13, 2009.http://chriscooley47.blogspot.com/2009/07/mmqb-smart-football.html.
"Create Innovative Services with Play Apps", Date of Download: Jan. 16, 2014, http://www.oledcomm.com/LIFI.html, Oledcomm—France LiFi.
Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE_Globecom_2012/papers/p1244-danakis.pdf> pp. 1244-1248.
Dawson, Keith; "LiFi in the Real World" All LED Lighting—Illuminating The Led Community, Jul. 31, 2013.
Delgado, Rick; "Why Fantasy Football Is Embracing Big Data", Sporttechie, Jan. 3, 2014.
"Dutch Football Fans Get The Ajax Experience With AV Technology From Electrosonic", Electrosonic Press Release, May 14, 2012.
FAQ, Go Pro Workouts, Date of Download: Apr. 30, 2014 https://www.goproworkouts.com/faqs.

(56) References Cited

OTHER PUBLICATIONS

"First Down Laser Systems to enhance game of football and fans in-stadium experience with green line", Sports Techie, Sep. 9, 2013.
"Football Workout Programs", Go Pro Workouts. Date of Download: Apr. 27, 2014 https://www.goproworkouts.com/workouts/football.
Freeman, Mark; "Frickin' Laser Beams", River Valley Leader, Feb. 19, 2013.
Gerhardt, Ryan; "Concussion Sensing Helmet Could Save Athletes", PSFK, Oct. 28, 2013.
Gerhardt, Ryan; "Vibrating Jersey Lets Fans Feel What Players Do on the Field", PSFK.com, Mar. 13, 2014.
"GoalControl to provide goal-line system at World Cup in Brazil", BBC Sport, Apr. 2, 2013.
Gorman, Michael; "Outstanding Technology brings visible light communication to phones and tablets via dongle and LEDs", Edgadget International Editions, Jul. 16, 2012.
"Growing data sets alter Sportsvision's real-time viewing experience", Sports Illustrated, More Sports, Nov. 29, 2013.
Haas, Harald; "Delivering safe and secure wireless communications", pureLiFi. Date of download: Jan. 16, 2014 http://purelifi.co.uk/.
"How to compare personal stats with the Pros?", Support Home Discussions Tranining with miCoach. Jul. 4, 2012.
"How to wear the Stride Sensor (inside the shoe)", by micoach, Guides & Tutorials, May 29, 2014.
Inamoto et al., Naho; "Immersive Observation of Virtualized Soccer Match at Real Stadium Model", Proceedings of the Second IEEE and ACM International Symposium on Mixed and Augmented Reality (ISMAR '03), 2003.
"Intel, NFL Legend Jerry Rice and others Team Up to "Look Inside the Huddle" On and Off the Field", by INTELPR in Intel Newsroom, Aug. 28, 2013.
Kumar, Navin; "Visible Light Communications Systems Conception and VIDAS", IETE Technical Review, vol. 25, Issue 6, Nov.-Dec. 2008. Date of download: Nov. 19, 2009. http://www.tr.ietejournals.org.
La Confora, Jason; "NFL collecting data that could revolutionize websites, video games", CBS Sports—NFL Insider, Nov. 25, 2012.
Laviers, Kennard R.; Sukthankar, Gita; "Using Opponent Modeling to Adapt Team Play in American Football", Plan, Activity, and Recognition, Elsevier, 2014. School of ECE, Air Force Institute of Technology. Preprint submitted: Oct. 31, 2013.
LiFi Overview—Green wireless mobile communication—LiFi Technology. Date of download: Jan. 16, 2014.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
Macleod, Robert; "New football helmet sensors monitor brain injuries", The Globe and Mail, Nov. 14, 2013.
Madden, Lance; "Pro Athletes Share Personal Workout Secrets With Startup 'Go Pro Workouts'", Forbes.com, SportsMoney. Mar. 4, 2013.
Maricle, Charles; "Federal rules for outdoor laser user in the U.S. (FAA authority over airspace)", Laser PointerSafety.com, Apr. 23, 2014.
"Methods to Our Madness", Football Outsiders Information, Innovative Statistics, Intelligent Analysis, http://www.footballoutsiders.com/info/methods, Date of Download: Apr. 10, 2014.
Miller, Mark J.; "NFL Sensors Will Track Player Stats for Fans, but What About Safety?", Sports in the Spotlight—brandchannel, Aug. 11, 2014.
Montero, Eric, "Design and Implementation of Color-Shift Keying for Visible Light Communications", Sep. 2013, McMaster University.
Morgan, Debra; "Referee Uses Capital Idea to Stop Game Clocks on a Whistle", Loca News. Nov. 18, 1999. http://www.wral.com/news/local/story/138889.
Naidu, Vinaya; "Watched The IPL? Now Find and Tag Yourself in the Stadium With Vodafone Fancam", Business 2 Community, May 22, 2013.
"New courtside technology unveiled at PISD tourney", Precision Time Systems—New Inventions That Prevent Human Errors in Sports Timekeeping, Date of Download: Apr. 23, 2014.
Nguyen et al., "A Novel like switching scheme using pre-scanning and RSS prediction in visible light communication networks", EURASIP Journal on Wireless Communications and Networking, 2013.
"Nike+ SportBand Users Guide", by nikeplus.com, Jun. 7, 2014.
"Nokia Lumia 920 pricing compared to iPhone 5 and Samsung Galaxy SIII", by Nokia, Sep. 30, 2012.
Ogawa; "Article about VLC Guidance developed", Visible Light Communications Consortium (VLCC), Aug. 31, 2012.
Ogawa; "iPhone app from CASIO", Visible Light Communications Consotium (VLCC), Apr. 26, 2012.
Ogus, Simon; "SportIQ Announces a Game Changing Real-Time Basketball Analytics Platform", Sporttechie.com, Mar. 7, 2014.
"Omega introduces new timing equipment for ice hockey at Sochi 2014 Olympic Winter Games", OMEGA Watches, Feb. 16, 2014.
"Outdoor Laser Operations", Advisory Circular, U.S. Department of Transportation, Dec. 30, 2014.
Perin et al., Charles; "Real-Time Crowdsourcing of Detailed Soccer Data", IEEE, Oct. 2013.
Povey, Gordon, "VLC for Location, positioning and navigation", Jul. 27, 2011, http://visiblelightcomm.com/vlc-for-location-positioning-and-n. . . .
"Riddell InSite Impact Response System", Riddell InSite. Oct. 18, 2013.
Roble, Bob; "Inside the Huddle: How Big Data Is Unlocking Fantasy Football Insights", IQ Sports—Sports Technology, Sep. 3, 2013.
Saag, Tonis; "You can compare your training data with friends again", SportlyzerBlog, Feb. 20, 2013.
"What is SafeBrain", SafeBrain Systems Inc. May 14, 2014.
Schoonmaker, Aaron; "NCAA ignoring own clock recommendations in tourney", WRALSportsFan.com, Mar. 25, 2014 http://www.wralsportsfan.com/ncaa-ignoring-own-clock-recommendations-in-tourney/13510770/.
"Smartabase—The complete solution for athlete data management", Fusion Sport, www.fusionsport.com, Jul. 21, 2011.
"Sports Event Services—Quality Information is the first gold medal at any event", Infostrada Sports, May 24, 2013.
Stein, Anne; "Devices help alert teams to potential concussions on the field", Tribune Newspapers, Jun. 27, 2012.
Thanigavel, M.; "Li-Fi Technology in Wireless Communication", International Journal of Engineering Research & Technology (IJERT), ISSN: 2278-0181, vol. 2 Issue 10, Oct. 2013.
"The Head Case Impact Sensor", Head Case Company, Sep. 24, 2013.
"The System Models & How They Work", Precision Time Systems—New Inventions That Prevent Human Errors in Sports Timekeeping, Date of Download: Apr. 24, 2014.
"The Wearables Coaching an Optimal Version of You", by PSFK Labs, iQ, Feb. 24, 2014.
"Train like professional athletes", Go Pro Workouts. Date of Download: Apr. 30, 2014 https://www.goproworkouts.com/.
"Viewing other miCoach stats", Support Home Discussions Training with miCoach, Jun. 26, 2012.
WKO—Hunter Allen—Peaks Coaching Group Oct. 14, 2015.
"Wirless Whistle System", Bodet Sport, Sport Display—Timer. Date of Download: Jun. 23, 2014 file:///C|/king/AOP/Wireless%20Whistle%20system.htm[Jun. 23, 2014 7:32:06 PM].
Won, Eun Tae; "Visible Light Communication: Tutorial", Project: IEEE P802.15 Working Group for Wireless Personal Area Networks (WPANs), Mar. 9, 2008.
"Link: Would You Like to See the Goal-Post Lengthened in Height in College Football", TideFans.com, May 6, 2014. http://www.tidefans.com/forums/showthread.php?t=222422&page=4.
PCT Application No. PCT/US2015/033613 International Search Report and Written Opinion mailed Sep. 1, 2015.

(56) References Cited

OTHER PUBLICATIONS

PCT Application No. PCT/US2015/040228 International Search Report and Written Opinion mailed Sep. 30, 2015.
PCT Application No. PCT/US2015/040229 International Search Report and Written Opinion mailed Oct. 1, 2015.
PCT Application No. PCT/US2015/047059 International Search Report and Written Opinion mailed Nov. 9, 2015.
U.S. Appl. No. 14/798,035 Office Action mailed Nov. 24, 2015.
U.S. Appl. No. 14/798,049 Final Office Action mailed Mar. 22, 2016.
U.S. Appl. No. 14/798,049 Office Action mailed Nov. 3, 2015.
U.S. Appl. No. 14/798,057 Office Action mailed Nov. 24, 2015.
U.S. Appl. No. 14/798,068 Office Action mailed Nov. 23, 2015.
U.S. Appl. No. 14/798,081 Office Action mailed Sep. 28, 2015.
U.S. Appl. No. 14/798,091 Office Action mailed Mar. 28, 2016.
U.S. Appl. No. 14/798,091 Office Action mailed Sep. 22, 2015.
U.S. Appl. No. 14/798,131 Office Action mailed Jan. 12, 2016.
U.S. Appl. No. 14/798,204 Office Action mailed Jan. 22, 2016.
U.S. Appl. No. 14/798,190 Office Action mailed Jan. 12, 2016.
U.S. Appl. No. 14/829,598 Office Action mailed Feb. 2, 2016.
U.S. Appl. No. 14/788,728 Final Office Action mailed Feb. 1, 2016.
U.S. Appl. No. 14/788,728 Office Action mailed Sep. 17, 2015.
U.S. Appl. No. 14/788,742 Final Office Action mailed Jan. 6, 2016.
U.S. Appl. No. 14/788,742 Office Action mailed Sep. 2, 2015.
U.S. Appl. No. 15/333,711, John E. Cronin Professional Workout Simulator, filed Oct. 25, 2016.
U.S. Appl. No. 14/798,131 Office Action mailed Sep. 20, 2016.
U.S. Appl. No. 14/798,204 Office Action mailed Dec. 20, 2016.
U.S. Appl. No. 14/798,131 Final Office Action mailed Mar. 21, 2017.
U.S. Appl. No. 14/798,190 Office Action mailed Mar. 8, 2017.

* cited by examiner

SENSOR EXPERIENCE GARMENT

CROSS-REFERENCE TO RELATED APPLICATIONS

The present application is a continuation of and claims priority to U.S. patent application Ser. No. 14/798,270 filed Jul. 13, 2015 and titled "Sensor Experience Shirt," which claims the priority benefit of U.S. Provisional Patent Application No. 62/023,606, filed on Jul. 11, 2014 and titled "Player Accelerometer Data and Fan Shirt LED Hit Intensity Replay," and U.S. Provisional Patent Application No. 62/029,610, filed on Jul. 28, 2014 and titled "Player Accelerometer Data and Fan Shirt LED Hit Intensity," the disclosures of which are incorporated herein by reference.

BACKGROUND OF THE INVENTION

Field of the Invention

The present invention relates generally to technology-integrated garments. More specifically, the present invention relates to translating collected sensor data for a garment.

Description of the Related Art

Organizations currently have a variety of options for enhancing the sensory experience of consumers. Theatres can show three-dimensional movies or provide chairs that shake and move according to a film. A consumer can feel, for example, what a driver in a movie may feel during a scene in the movie. Marketers can place microphones on players and coaches during sports events and allow viewers to hear audio clips from a game. A viewer can hear the impact of sports equipment during tackles and hear the quarterback on the field.

It is difficult, however, to allow users to experience sensory data such as accelerometer data collected from different players. A user may want to see an instant replay of an event, experience the vibrations associated with a tackle, and experience the tackle from the perspective of multiple players. It is also difficult to allow a user to share a sensory experience with other users during an event. A user may want to know whether another user experienced the same tackle and may want to know without having to interrupt during an event.

There is a need in the art for improved systems and methods for enhancing audience sensory experience.

SUMMARY OF THE PRESENTLY CLAIMED INVENTION

One exemplary method for enhancing audience sensory experience describes receiving impact data from one or more sensors. The one or more sensors are on one or more wearable items. The method also describes processing the received data to associate location information with the received data. The location information specifies sensor location on the one or more wearable items for each of the one or more sensors. The method also describes transmitting the processed data to an application at a user device. The transmitted data is processed to provide input to one or more light-emitting diodes and one or more vibrators and to identify the one or more light-emitting diodes and the one or more vibrators receiving input. The one or more light-emitting diodes and the one or more vibrators are located at a location corresponding to a location of the one or more sensors. Input causes each of the one or more light-emitting diodes to illuminate and causes each of the one or more vibrators to vibrate.

One exemplary system for enhancing audience sensory experience provides one or more sensors, one or more wearable items, one or more light-emitting diodes, one or more vibrators, and a processor. Execution of instructions stored in the memory by the processor performs a set of operations. The operations include receiving impact data from the one or more sensors. The one or more sensors are on the one or more wearable items. The operations also include processing the received data to associate location information with the received data. The location information specifies sensor location on the one or more wearable items for each of the one or more sensors. The operations also include transmitting the processed data to an application at a user device. The transmitted data is processed to provide input to one or more light-emitting diodes and one or more vibrators and to identify the one or more light-emitting diodes and the one or more vibrators receiving input. The one or more light-emitting diodes and the one or more vibrators are located at a location corresponding to a location of the one or more sensors. Input causes each of the one or more light-emitting diodes to illuminate and causes each of the one or more vibrators to vibrate.

One exemplary non-transitory computer-readable storage medium is also described, the non-transitory computer-readable storage medium having embodied thereon a program executable by a processor to perform an exemplary method for enhancing audience sensory experience. The exemplary program method describes receiving impact data from one or more sensors. The one or more sensors are on one or more wearable items. The program method also describes processing the received data to associate location information with the received data. The location information specifies sensor location on the one or more wearable items for each of the one or more sensors. The program method also describes transmitting the processed data to an application. The transmitted data is processed to provide input to one or more light-emitting diodes and one or more vibrators and to identify the one or more light-emitting diodes and the one or more vibrators receiving input. The one or more light-emitting diodes and the one or more vibrators are located at a location corresponding to a location of the one or more sensors. Input causes each of the one or more light-emitting diodes to illuminate and causes each of the one or more vibrators to vibrate.

DETAILED DESCRIPTION

The present invention includes systems and methods for enhancing audience sensory experience. Light-emitting diodes and vibrators may activate on an audience member shirt when an actor receives a hit while wearing a shirt having sensors. The audience member may choose to receive input from a particular actor's shirt. The audience member may also choose to view a replay of an event and activate the associated light-emitting diodes and vibrators.

Audience sensory experience can be enhanced at entertainment or cultural events that are presented at a theatre, gymnasium, stadium, or other facility to a group of people. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, the opera, and the like; religious events; and more permanent exhibitions such as museum, historic home, and the like. Names used for people and organizations are exemplary.

Figure 1:
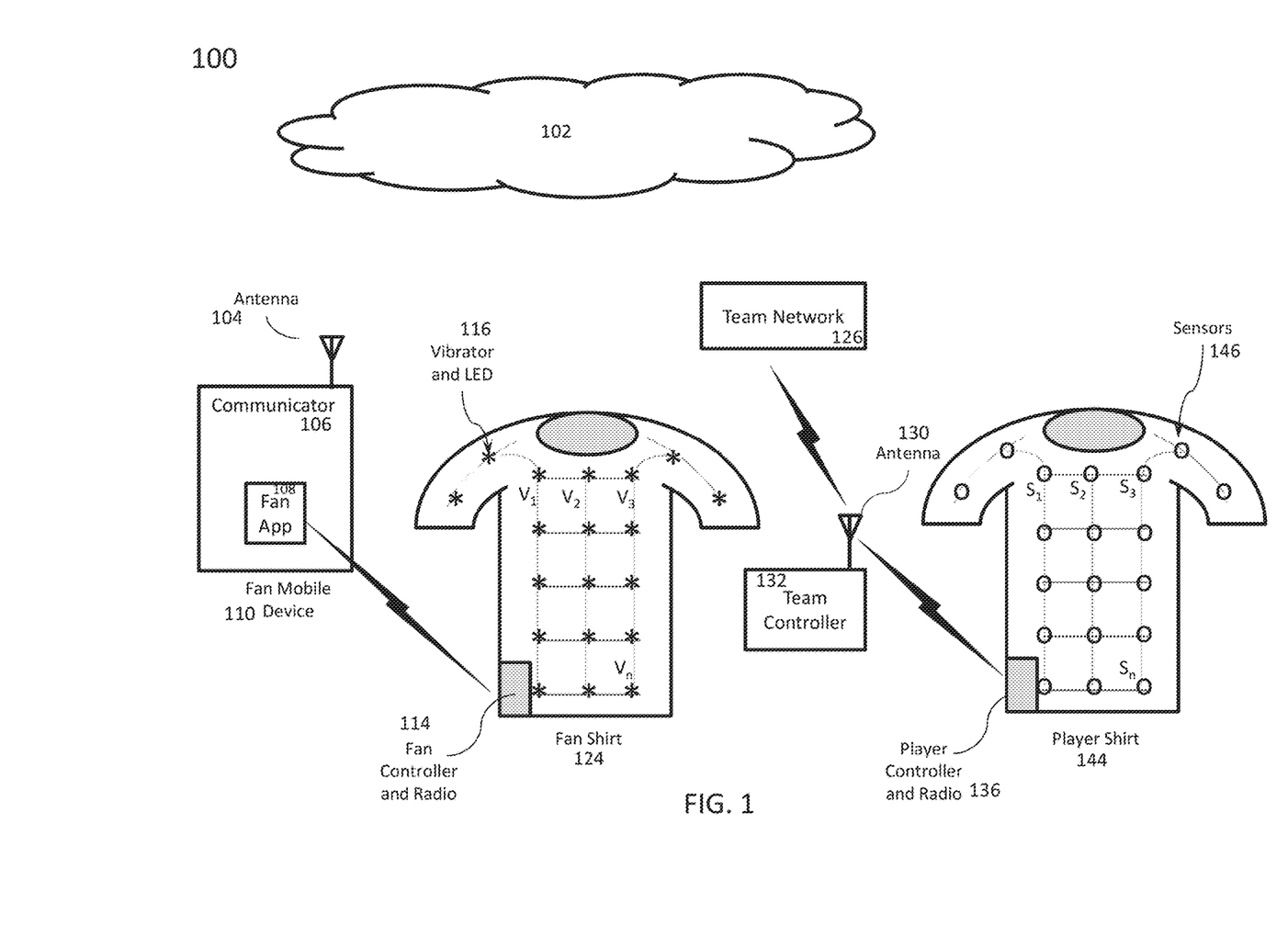
FIG. 1 illustrates a system for enhancing audience sensory experience.

FIG. 1 illustrates a system 100 for enhancing audience sensory experience. The system 100 of FIG. 1 includes a communication network 102 (e.g., the Internet or cloud), a fan mobile device 110, a fan shirt 124, a team network 126, a team controller 132, and a player shirt 144. The team controller 132 includes a team controller antenna 130. The fan mobile device 110, the fan shirt 124, the team network 126, the team controller 132, and the player shirt 144 may also communicate via the communication network 102.

The player shirt 144 includes a plurality of sensors 146 (e.g., Si-a) and a player controller and radio 136. The plurality of sensors 146 may be accelerometers. The plurality of sensors 146 may collect data when, for example, an object or a person impacts the player shirt 144 while a player is wearing the player shirt 144. The plurality of sensors 146 may send sensor data to the player controller and radio 136 in real time. The plurality of sensors 146 is in communication with the player controller and radio 136. The plurality of sensors 146 may be in communication with the player controller and radio 136 through wires or through one or more wireless means. The player controller and radio 136 may send received data to the team controller 132 in real time. The team controller 132 may collect real-time player data and transfer the data to the team network 126 in real time. Data stored in the team network 126 is accessible via the communication network 102.

The fan mobile device 110 includes a fan mobile device antenna 104, a communicator unit 106, and a fan application ("app") 108. The fan app 108 may access data in the team network 126 via the communication network 102. The fan app 108 may also access data stored in the mobile device 110. The fan app 108 may access the communication network 102 using the communicator unit 106. The communicator unit 106 may access the communication network 102 using the antenna 104.

The fan shirt 124 includes a plurality of vibrator and light-emitting diode (LED) units 116 (e.g., $V_{1-n}$) and a fan controller and radio 114. The fan controller and radio 114 may receive data from the fan app 108 and process the received data to activate at least one of the plurality of vibrator and LED units 116. A vibrator and LED unit may illuminate and vibrate when activated.

The plurality of vibrator and LED units 116 are in communication with the fan controller and radio 114. The plurality of vibrator and LED units 116 may be in communication with the fan controller and radio 114 through wires or through one or more wireless means. Fan controller and radio input at a vibrator and LED unit may cause the associated vibrator to vibrate. Fan controller and radio input at a vibrator and LED unit may also cause the associated LED to illuminate. When an object or a person hits the player shirt 144, the fan shirt 124 may receive input such that vibration and illumination of the fan shirt 124 corresponds to the quantity and location of impact at the player shirt 144. A fan shirt 124 may, for example, light up and vibrate at the right sleeve when the player shirt 144 receives a hit at the right sleeve. A fan shirt 124 may, for example, light up intensely at the right sleeve when the player shirt 144 receives multiple hits at the right sleeve within a short period of time. Each of the plurality of vibrator and LED units 116 may also activate based on the impact intensity at the player shirt 144. The fan shirt 124 may, for example, light up and vibrate intensely when the player shirt 144 receives a hard hit. Vibrator and LED unit activation may occur in real time as an associated player shirt receives a hit.

Figure 2:
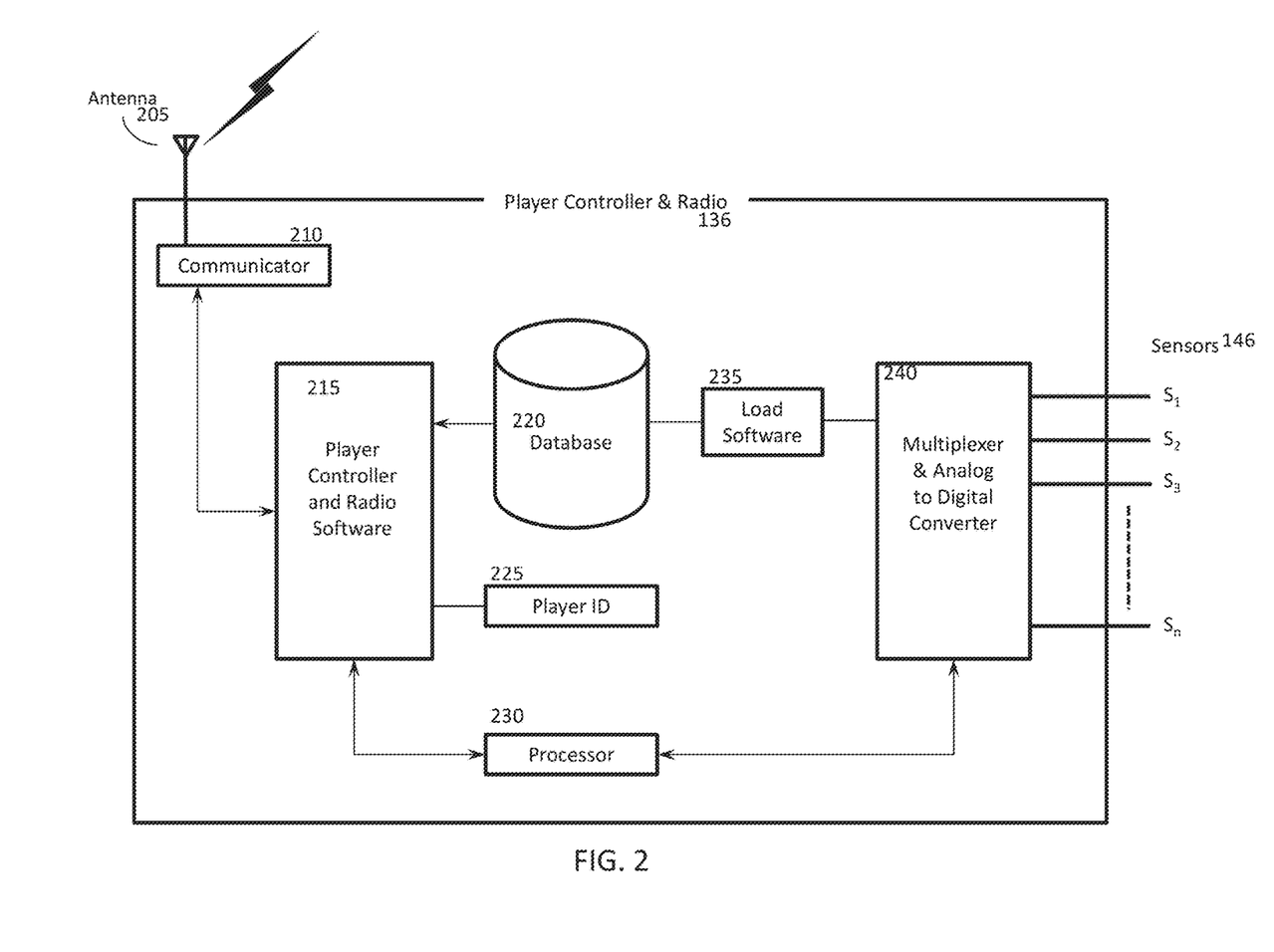
FIG. 2 illustrates a player controller and radio.

FIG. 2 illustrates the player controller and radio 136. The player controller and radio 136 of FIG. 2 includes an antenna 205, a communicator unit 210, a player controller and radio software 215, a database 220, a player identification (ID) unit 225, a processor 230, a load software 235, and a multiplexer and analog-to-digital converter 240.

The multiplexer and analog-to-digital converter 240 receives data from the plurality of sensors 146. The multiplexer and analog-to-digital converter 240 converts analog data to digital data. The player controller and radio 136 may use the load software to manage data received from the plurality of sensors 146 and load digital data from the multiplexer and analog-to-digital converter 240 to the database 220. The player controller and radio 136 may use the player controller and radio software 215 to manage data stored in the database 220 and player identification information in the player ID unit 225. Data in the database 220 may be organized based on location of the associated sensor. Data in the database 220 may also be associated with player identification information provided by the player ID unit 225. Player identification information may identify the player wearing the player shirt 144 when the player shirt 144 received the associated impact. The player controller and radio software 215 may load data for transfer from the database 220 and the player ID unit 225 to the team controller 132. The player controller and radio 136 may send data received from the plurality of sensors 146 to the team controller 132 in real time and communicate with the team controller 132 using the communicator unit 210. The communicator unit 210 may use the antenna 205 to communicate with the team controller 132. The processor 230 may be used to run the player controller and radio 136.

Figure 3:
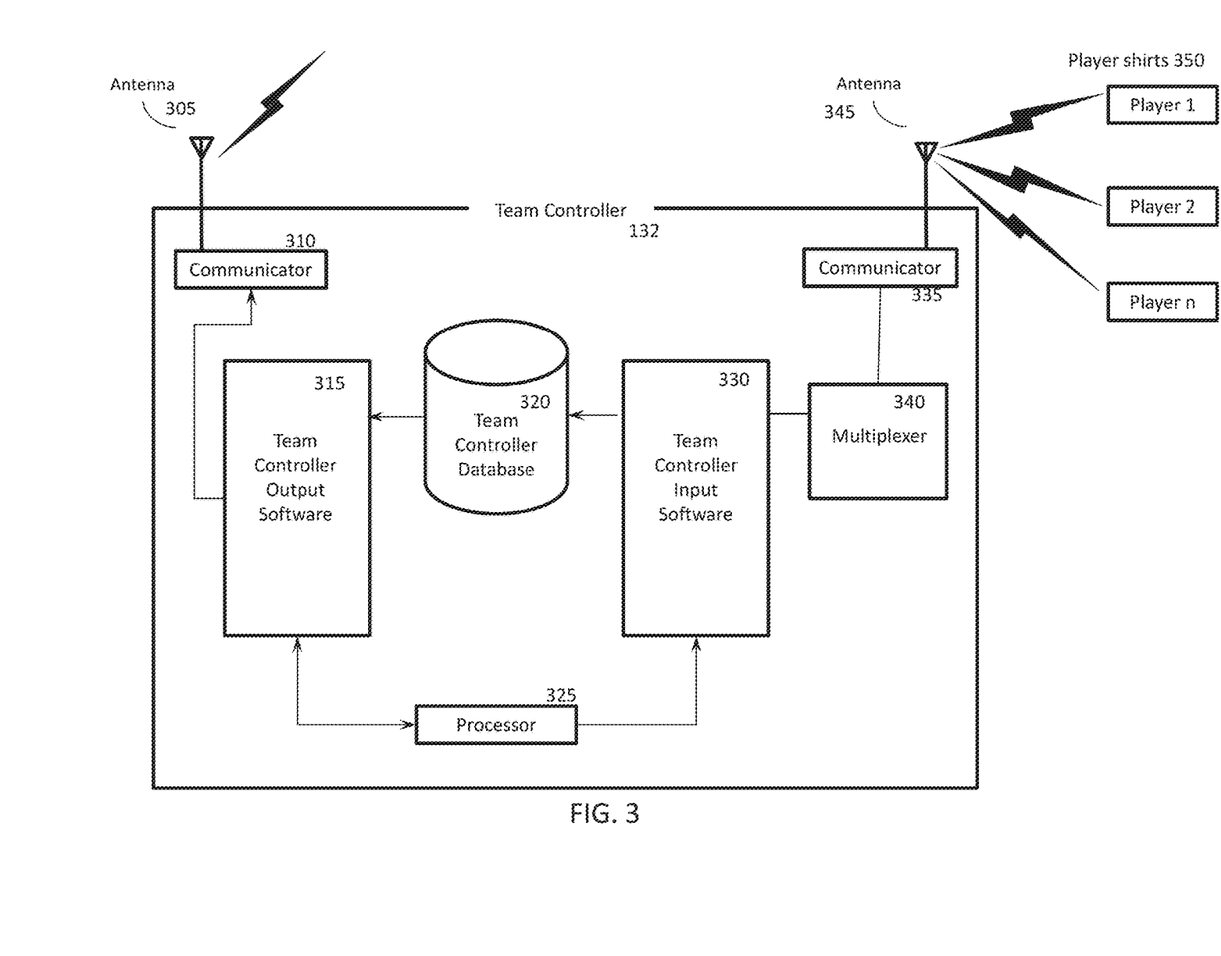
FIG. 3 illustrates a team controller.

FIG. 3 illustrates the team controller 132. The team controller 132 of FIG. 3 includes two antennas 305, 345, two communicator units 310, 335, a team controller output software 315, a team controller database 320, a processor 325, a team controller input software 330, and a multiplexer 340. In other embodiments, more antennas, or fewer antennas, may be included. In other embodiments, more communicator units, or fewer communicator units, may be included.

The team controller 132 may receive data from a plurality of player shirts 350 (e.g., Player 1, 2 . . . n) via the communicator unit 335. The team controller 132 may use the multiplexer to provide data input to the team controller input software 330. The team controller 132 may transfer data to the team controller database 320 using the team controller input software 330. The team controller 132 may load data for transfer from the team controller database 320 to the team network 126. The team controller 132 may send data received from the plurality of player shirts 350 to the team network 126 in real time and communicate with the team network 126 using the communicator unit 310. The communicator unit 310 may use the antenna 305 to communicate with the team network 126. The processor 325 may be used to run the team controller 132.

Figure 4:
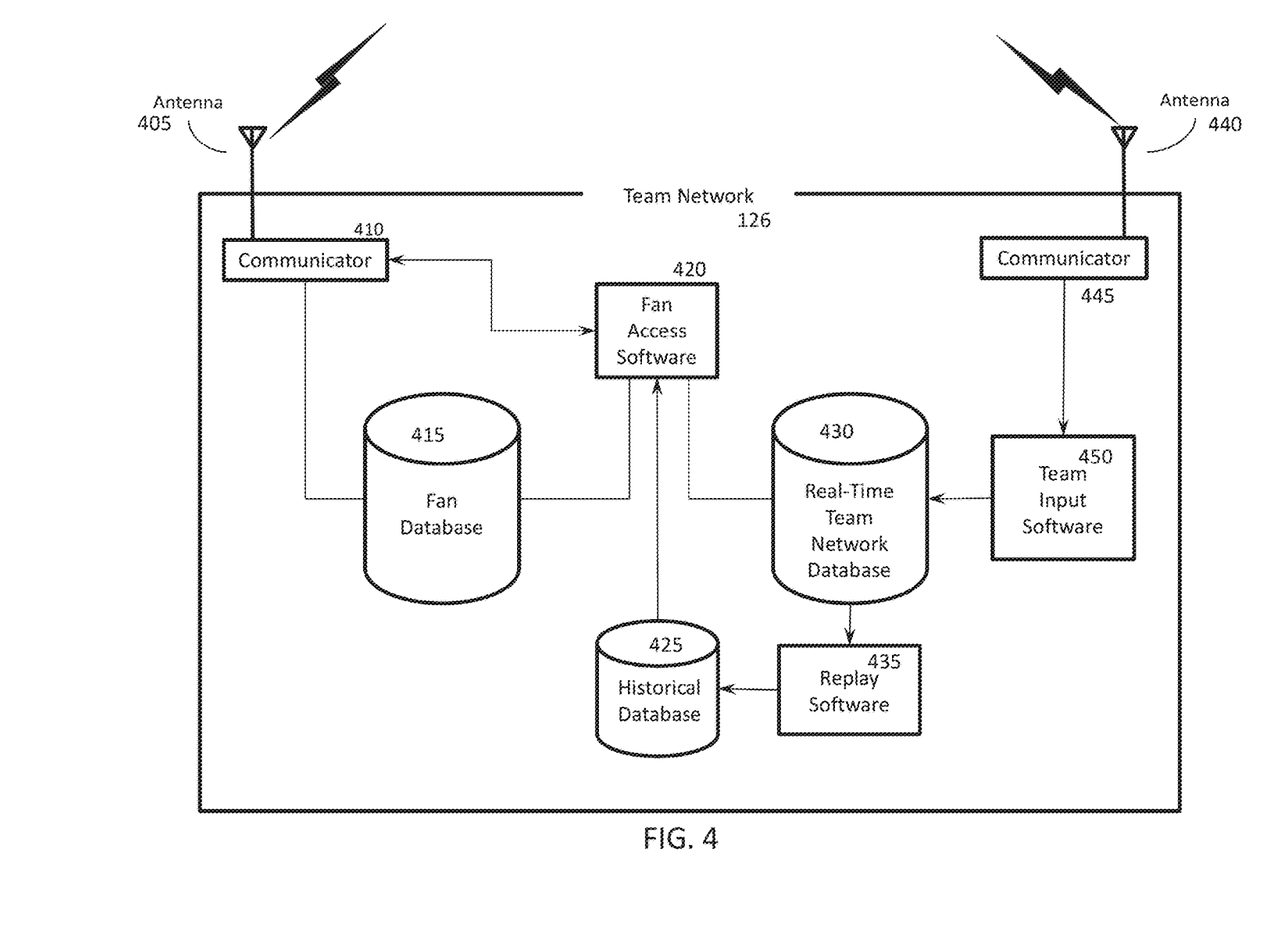
FIG. 4 illustrates a team network.

FIG. 4 illustrates the team network 126. The team network 126 of FIG. 4 includes two antennas 405, 440, two communicator units 410, 445, a fan database 415, a fan access software 420, a real-time team network database 430, and a team input software 450. The team network 126 may also include a historical database 425 and a replay software 435. In other embodiments, more antennas, or fewer antennas, may be included. In other embodiments, more communicator units, or fewer communicator units, may be included.

The team network 126 may use the team input software 450 to load data received through the communicator unit 445 to the team network database 430. The team network 126 may use the replay software 435 to input data associated with an event from the team network database 430 to the historical database 425 at the end of the associated event.

The team network 126 may use the fan access software 420 to input user data such as user profile data to the fan database 415. The fan database 415 may store data used by the team network 126 in determining access rights of a user. The team network 126 may use the fan access software 420 to determine access rights 415 before providing a user with data from the team network database 430 or the historical database 425. When a user requests fan shirt data for "Player 11," for example, the team network 126 may examine the fan database 415 to identify the user's account and determine whether the user provided payment to receive data input for the fan shirt 124. The team network 126 may also use the fan access software 420 to provide data from the team network database 430 and the historical database 425 to the fan app 108. The team network 126 may also use the fan access software 420 to provide data from the fan database 415 to the fan app 108.

The team network 126 may communicate with the fan app 108 via the communicator unit 410. The communicator unit 410 may communicate using the antenna 410.

Figure 5:
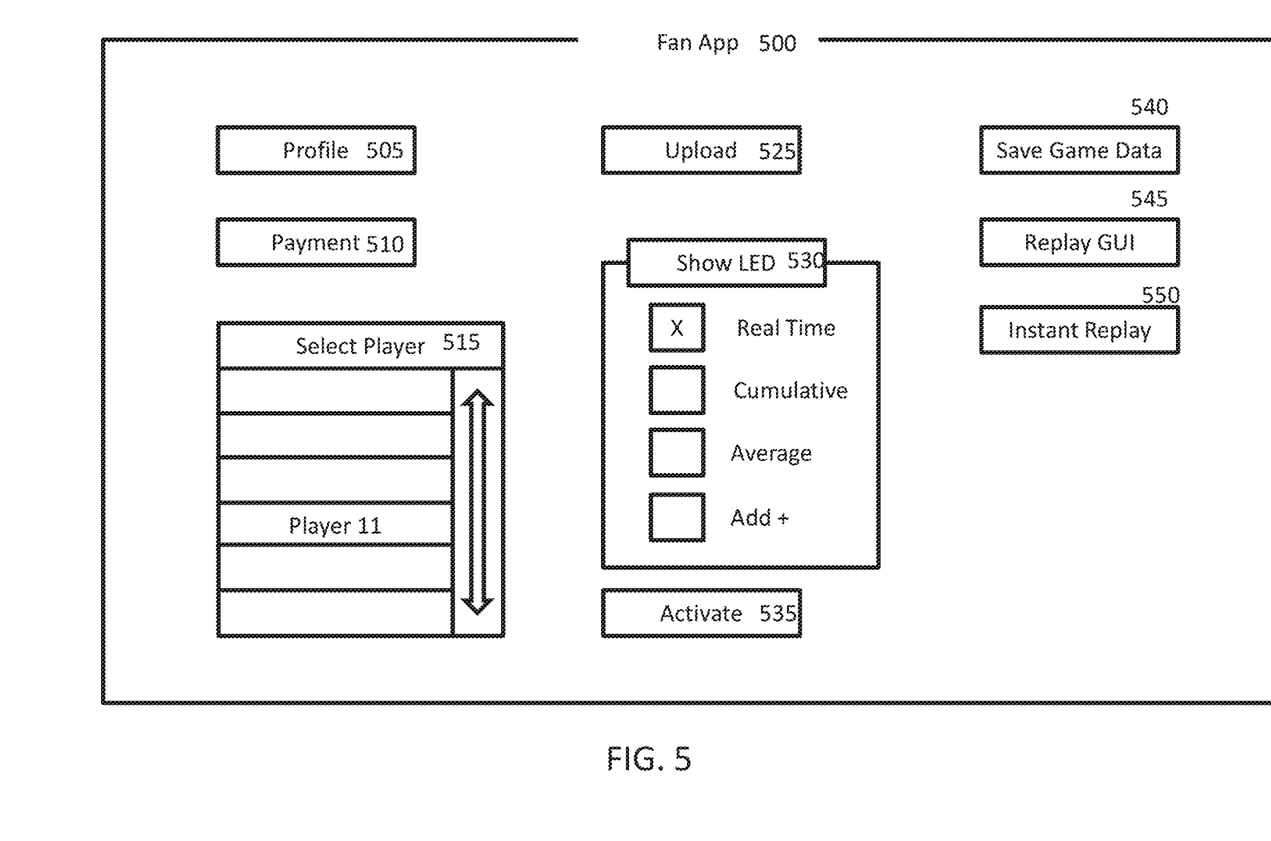
FIG. 5 illustrates a fan application ("app") graphical user interface (GUI).

FIG. 5 illustrates a fan application ("app") graphical user interface (GUI) 500. The fan app GUI 500 of FIG. 5 includes a profile button 505, a payment button 510, a select player section 515, an upload button 525, a show LED section 530, and an activate button 535. The fan app GUI 500 may also include a save game data button 540, a replay GUI button 545, and an instant replay button 550.

A fan app GUI user may select the profile button 505 to input user information through a profile GUI (not shown). The user may input user information such as name, an ID associated with a fan app account, and credit card information. The user may select a payment method using the payment button 510. The user may access the team network 126 by logging into a fan app account and providing payment through the fan app 108.

The user may make a player selection using the select player section 515. For example, "Player 11" is selected in the select player section 515. The player selection associates the fan app 108 with the selected player. The fan shirt 124 receives data associated with the selected player from the fan app 108.

The user may adjust settings for the plurality of LEDs in the associated fan shirt 124 using the show LED section 530. The show LED section 530 may include various options such as a real-time option, a cumulative option, an average option, and an add option.

Selection of the real-time option may cause the corresponding plurality of fan shirt LEDs to blink when the associated player shirt 144 receives a hit. Selection of the cumulative option may cause the corresponding plurality of fan shirt LEDs to illuminate in increased brightness as the associated player shirt 144 receives additional hits. The fan app 108 may process received data to increase LED brightness each time the selected player receives a hit at the corresponding location.

When a user selects the average option, brightness of the corresponding plurality of fan shirt LEDs may change based on an average number of hits for the associated player shirt 144. The number of hits received by the associated player shirt 144 may be averaged based on elapsed time. The fan shirt 124 may light up intensely during the first half of an event when the associated player receives numerous hits and dim during the second half of the event when the associated player receives fewer hits. The user may select or provide additional options by selecting the add option. The user may, for example, use the add option to keep all LEDs of the associated fan shirt 124 illuminated.

The user may upload fan app GUI inputs to the team network 126 by selecting the upload button 525. The user may also activate selections made though the fan app GUI 500 using the activate button 535.

The user may use the save game data button 540 to save video data and fan shirt data from an event. A user may save, for example, video of an event and data used to activate the fan shirt 124 according to hits received during the event. The data may be saved to the mobile device 110.

The user may view an instant replay during an event using the instant replay button 550. When the user watches the instant replay, the fan shirt 124 may also vibrate and illuminate when the selected player receives a hit during the instant play. The fan app 108 may retrieve video data and fan shirt data used for an instant replay from the mobile device 110 or from the historical database 425. The user may access a replay GUI (not shown) using the replay GUI button 545.

Figure 6:
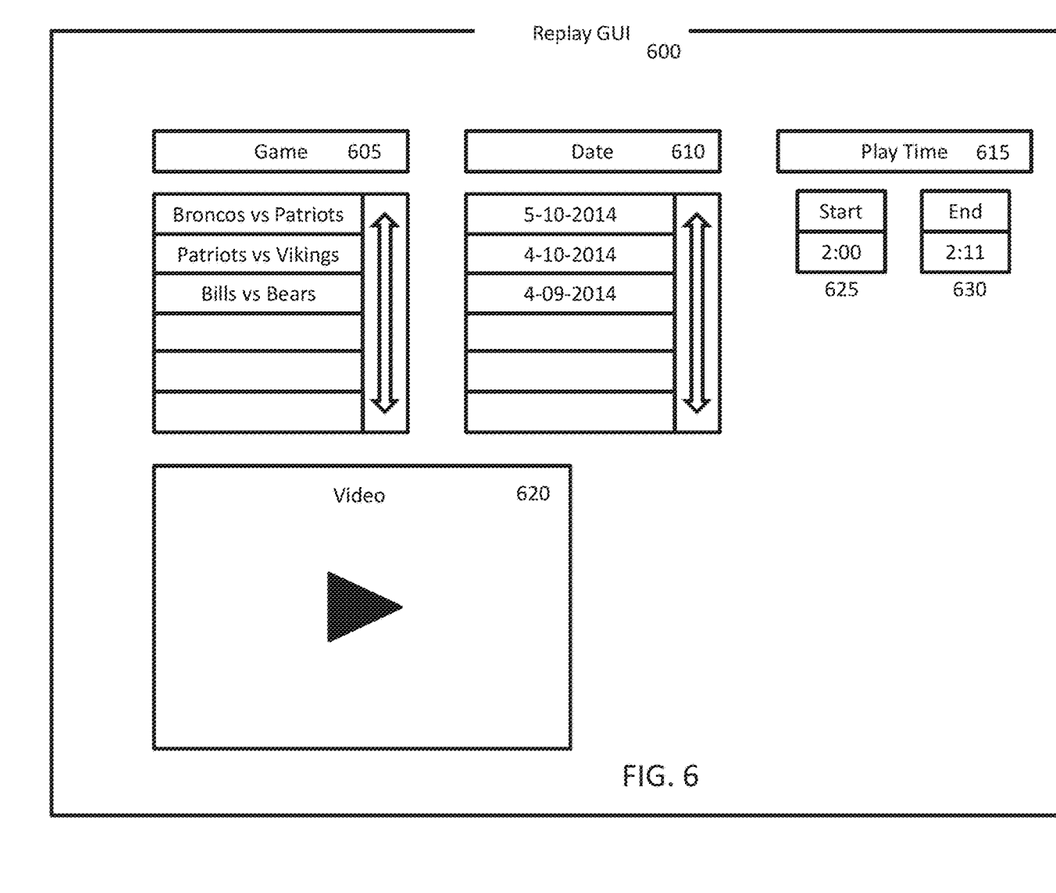
FIG. 6 illustrates a replay GUI.

FIG. 6 illustrates the replay GUI 600. The replay GUI 600 of FIG. 6 includes a game section 605, a date section 610, a play time section 615, and a viewer 620. The play time section 615 includes a start input 625 and an end input 630. A replay GUI user may select an event clip using the game section 605, the date section 610, and the play time section 615 and view the selected event clip using the viewer 620. The selected event clip may be retrieved from the historical database 425. The selected event clip may also be retrieved from the mobile device 110 if the event data was saved using the save game data button 540. The user may select an event clip based on an event name in the game section 605. The user may also select an event clip by specifying the event date in the date section 610. The user may specify the start point and end point of a clip using the play time section 615. The user may, for example, watch eleven seconds of an event, starting at two minutes into the event, by inputting "2:00" for the start input 625 and "2:11: for the end input 630. Processed sensor data may also be retrieved along with the event clip. When the user watches the selected event clip, the fan shirt 124 may also vibrate and illuminate according to hits received by the selected player during the event clip.

Figure 7A:
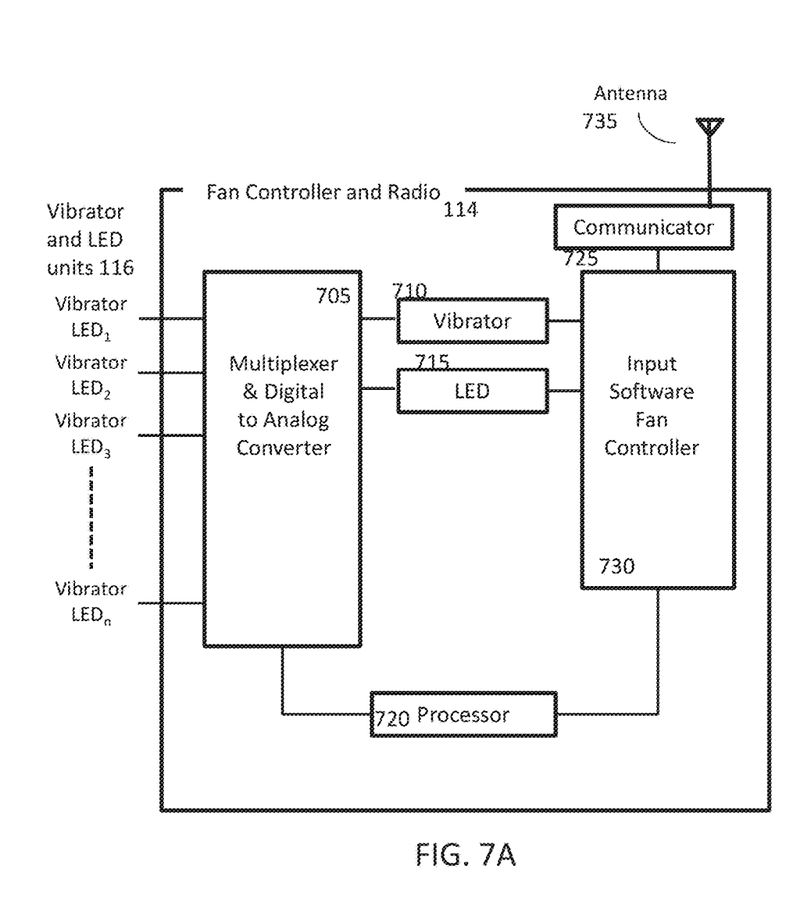
FIG. 7A illustrates a fan controller and radio.

FIG. 7A illustrates the fan controller and radio 114. The fan controller and radio 114 of FIG. 7A includes a multiplexer and digital-to-analog converter 705, a vibrator unit 710, an LED unit 715, a processor 720, an antenna 735, a communicator unit 725, and an input software 730. The fan controller and radio 114 may wirelessly receive input from the fan app 108 via the communicator unit 725. The communicator unit 725 may use the antenna 735 to wirelessly receive input. The fan controller and radio 114 may use the input software 730 to manage received data and provide input to active at least one corresponding vibrator and LED unit 116. The fan controller and radio 114 may use the input software 730 to provide data identifying which vibrator to vibrate, which LED to illuminate, the intensity of vibration, and the intensity of illumination. The input software 730 may provide vibrator input to the multiplexer and digital-to-analog converter 705 through the vibrator unit 710. The input software 730 may also provide LED input to the multiplexer and digital-to-analog converter 705 through the LED unit 715. The multiplexer and digital-to-analog converter 705 may convert digital data received from the processor 720 to analog data. The multiplexer and digital-to-analog converter 705 may provide the analog data to the corresponding vibrator and LED units 116. The processor 720 may be used to run the fan controller and radio 114.

Figure 7B:
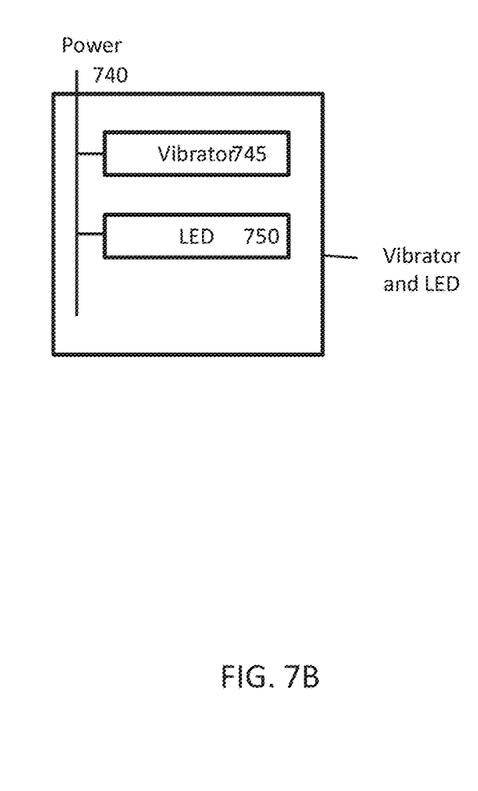
FIG. 7B illustrates one of a plurality of vibrator and light-emitting diode (LED) units.

FIG. 7B illustrates one of the plurality of vibrator and LED units 116. The vibrator and LED unit includes a power source 740, a vibrator 745, and an LED 750. The vibrator 745 and the LED 750 receive power from the power source 740. The power source 740 may power the vibrator 745 to allow the vibrator 745 to vibrate. The power source 740 may power the LED 750 to allow the LED 750 to illuminate. The LED 750 may be located outside the fan shirt 124. The vibrator 745 may be located inside the fan shirt 124.

Figure 8:
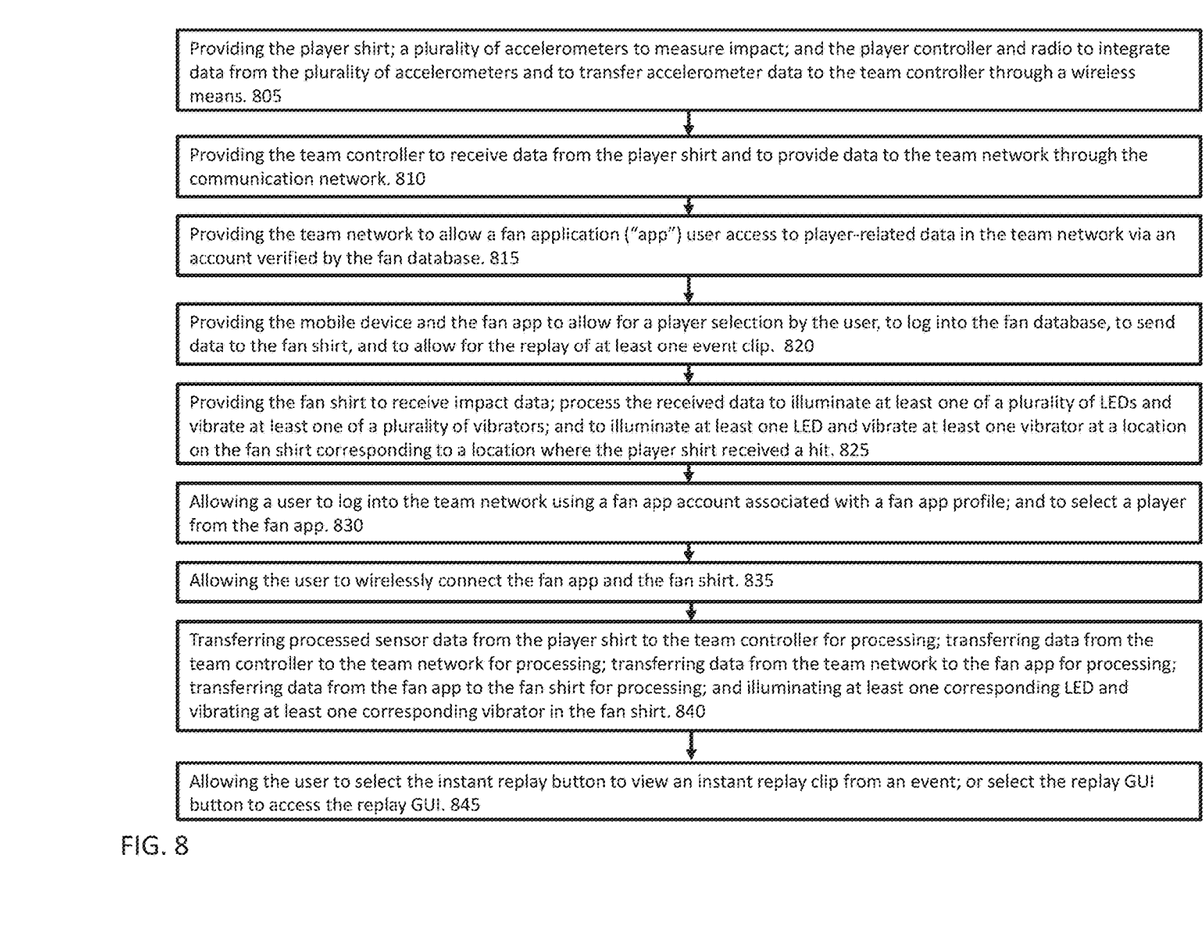
FIG. 8 illustrates a method for enhancing audience sensory experience.

FIG. 8 illustrates a method 800 for enhancing audience sensory experience. The method 800 may include, at block 805, providing the player shirt 144; a plurality of accelerometers to measure impact; and the player controller and radio 136 to integrate data from the plurality of accelerometers and to transfer accelerometer data to the team controller 132 through a wireless means.

The method 800 may include, at block 810, providing the team controller 132 to receive data from the player shirt 144 and to provide data to the team network 126 through the communication network 102.

The method 800 may include, at block 815, providing the team network 126 to allow a fan application ("app") user access to player-related data in the team network 126 via an account verified by the fan database 415.

The method 800 may include, at block 820, providing the mobile device 110 and the fan app 108 to allow for a player selection by the user, to log into the fan database 415, to send data to the fan shirt 124, and to allow for the replay of at least one event clip.

The method 800 may include, at block 825, providing the fan shirt 124 to receive impact data; process the received data to illuminate at least one of a plurality of LEDs and vibrate at least one of a plurality of vibrators; and to illuminate at least one LED and vibrate at least one vibrator at a location on the fan shirt 124 corresponding to a location where the player shirt 144 received a hit.

The method 800 may include, at block 830, allowing a user to log into the team network 126 using a fan app account associated with a fan app profile; and to select a player from the fan app 108. The method 800 may include, at block 835, allowing the user to wirelessly connect the fan app 108 and the fan shirt 124. The method 800 may include, at block 840, transferring processed sensor data from the player shirt 144 to the team controller 132 for processing; transferring data from the team controller 132 to the team network 126 for processing; transferring data from the team network 126 to the fan app 108 for processing; transferring data from the fan app 108 to the fan shirt 124 for processing; and illuminating at least one corresponding LED and vibrating at least one corresponding vibrator in the fan shirt 124. The method 800 may include, at block 845, allowing the user to select the instant replay button 550 to view an instant replay clip from an event; or select the replay GUI button 545 to access the replay GUI 600.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.). Names used for people and organizations are exemplary.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for impact notification, the method comprising:
   receiving at a network interface payment confirmation sent from a user device over a communication network, wherein the payment confirmation allows transmission of impact data to the user device;
   detecting an impact via one or more impact-detecting sensors, the one or more impact-detecting sensors being at least a subset of a plurality of garment sensors, and the plurality of garment sensors coupled to a garment;
   identifying one or more impact locations on the garment, the one or more impact locations associated with the one or more impact-detecting sensors; and
   transmitting impact data via a wireless communicator based on the received payment confirmation, the transmitted impact data identifying at least the one or more impact locations, and wherein the transmitted impact data is received by the user device that identifies the one or more impact locations via one or more output components.

2. The method of claim 1, wherein transmitting the impact data via the wireless communicator includes transmitting the impact data to a controller device, which then transmits the impact data to the user device.

3. The method of claim 1, wherein transmitting the impact data via the wireless communicator includes transmitting the impact data directly to the user device.

4. The method of claim 1, wherein the output components of the user device include at least one of a light source or a vibrator.

5. The method of claim 1, wherein the garment is a shirt.

6. The method of claim 1, wherein the user device is a second garment.

7. The method of claim 6, wherein the user device is a shirt.

8. The method of claim 1, wherein the plurality of sensors includes at least one accelerometer.

9. The method of claim 1, wherein the impact data also includes intensity data identifying an intensity of the detected impact as detected by the one or more impact sensors.

10. A system for impact notification, the system comprising: a garment;

a network server that receives payment confirmation associated with a user device, wherein the payment confirmation allows transmission of impact data from the team network to the user device;

a plurality of garment sensors coupled to the garment, wherein one or more impact-detecting sensors detect an impact, the one or more impact-detecting sensors being at least a subset of a plurality of garment sensors, and wherein the one or more impact-detecting sensors is associated with one or more impact locations on the garment; and a wireless communicator coupled to the garment, the wireless communicator transmitting impact data identifying at least the one or more impact locations based on the received payment confirmation, and wherein the transmitted impact data is received by the user device that identifies the one or more impact locations via one or more output components.

11. The system of claim 10, further comprising a controller device that receives the impact data transmitted via the wireless communicator, wherein the controller device then transmits the impact data to the user device.

12. The system of claim 10, wherein the output components of the user device include at least one of a light source or a vibrator.

13. The system of claim 10, wherein the garment is a shirt.

14. The system of claim 10, wherein the user device is a second garment.

15. The system of claim 14, wherein the user device is a shirt.

16. The system of claim 10, wherein the plurality of sensors includes at least one accelerometer.

17. The system of claim 10, wherein the impact data also includes intensity data identifying an intensity of the detected impact as detected by the one or more impact sensors.

18. A non-transitory computer-readable storage medium having embodied thereon a program executable by a processor for impact notification, the method comprising:

receiving payment confirmation associated with a user device, wherein the payment confirmation allows transmission of impact data to the user device;

detecting an impact via one or more impact-detecting sensors, the one or more impact-detecting sensors being at least a subset of a plurality of garment sensors, and the plurality of garment sensors coupled to a garment;

identifying one or more impact locations on the garment, the one or more impact locations associated with the one or more impact-detecting sensors; and transmitting impact data via a wireless communicator based on the received payment confirmation, the transmitted impact data identifying at least the one or more impact locations, and wherein the transmitted impact data is received by the user device that identifies the one or more impact locations via one or more output components.

* * * * *